United States Patent
Karunamoorthy et al.

(10) Patent No.: US 9,280,385 B2
(45) Date of Patent: Mar. 8, 2016

(54) OPTIMALLY PROVISIONING AND MERGING SHARED RESOURCES TO MAXIMIZE RESOURCE AVAILABILITY

(71) Applicant: International Business Machines Corporation, Armonk, NY (US)

(72) Inventors: Dileban Karunamoorthy, Carlton (AU); Timothy Lynar, Kew (AU); Suraj Pandey, Parkville (AU); John Wagner, Plainville, CT (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 14/135,557

(22) Filed: Dec. 19, 2013

(65) Prior Publication Data
US 2015/0178127 A1    Jun. 25, 2015

(51) Int. Cl.
G06F 9/48 (2006.01)
(52) U.S. Cl.
CPC .................................. G06F 9/4856 (2013.01)
(58) Field of Classification Search
CPC .................................................. G06F 9/4856
USPC .............. 709/224, 231, 238, 239; 718/1, 104
See application file for complete search history.

(56) References Cited

U.S. PATENT DOCUMENTS

| | | | |
|---|---|---|---|
| 7,409,525 B1 | 8/2008 | Clark et al. | |
| 8,429,630 B2 | 4/2013 | Nickolov et al. | |
| 8,484,661 B2 | 7/2013 | Walsh | |
| 2008/0301673 A1* | 12/2008 | Kawasaki | G06F 9/45516 718/1 |
| 2010/0115490 A1* | 5/2010 | Wilcock | G06F 8/70 717/104 |
| 2012/0131591 A1* | 5/2012 | Moorthi et al. | 718/104 |
| 2013/0160008 A1 | 6/2013 | Cawlfield et al. | |
| 2013/0332927 A1* | 12/2013 | Tang et al. | 718/1 |

FOREIGN PATENT DOCUMENTS

WO    2013101837    7/2013

OTHER PUBLICATIONS

"Optimization Techniques for Memory Virtualization-based Resource Management"—Jui-Hao Chiang, Stony Brook University, Dec. 2012 http://www.ecsl.cs.sunysb.edu/tr/TR253_thesis.pdf.*

(Continued)

*Primary Examiner* — Randy Scott
(74) *Attorney, Agent, or Firm* — Law Office of Charles W. Peterson, Jr.; Louis J. Percello, Esq.

(57) ABSTRACT

A shared resource system, a method of managing resources on the system and computer program products therefor. A resource consolidation unit causes identification of identical memory segments on host computers. The resource consolidation unit may be in one or more host computers. Each identical memory segment is associated with multiple instances of resources provisioned on at least two host computers. The resource consolidation unit causes provisioned resources to be migrated for at least one instance from one of the two hosts to another. On the other host computer the migrated resources share respective identical memory segments with resources already provisioned on the other host.

25 Claims, 7 Drawing Sheets

(56) References Cited

OTHER PUBLICATIONS

Harji et al., "Comparing high-performance multi-core web-server architectures." Proceedings of the 5th Annual International Systems and Storage Conference. ACM, 2012.

Miller "Analyzing Shared Memory Opportunities in Different Workloads." KIT—Universität des Landes Baden-Württemberg and nationales Forschungszentrum in der Helmholtz-Gemeinschaft (Aug. 2011-Nov. 2011).

Lagar-Cavilla et al., "SnowFlock: Rapid Virtual Machine Cloning for Cloud Computing," EuroSys'09, Apr. 1-3, 2009, Nuremberg, Germany.

Wood et al. "Black-box and Gray-box Strategies for Virtual Machine Migration." NSDI. vol. 7. 2007.

Chang et al., "An Empirical Study on Memory Sharing of Virtual Machines for Server Consolidation," Ninth IEEE International Symposium on Parallel and Distributed Processing with Applications May 26-28, 2011.

* cited by examiner

OPTIMALLY PROVISIONING AND MERGING SHARED RESOURCES TO MAXIMIZE RESOURCE AVAILABILITY

BACKGROUND OF THE INVENTION

1. Field of the Invention

The present invention is related to managing shared resources and more particularly to consolidating allocated resources across multiple computers to minimize computer resources, and especially memory, consumed by provisioned resources.

2. Background Description

Acquiring and managing Information Technology (IT) is a major budgetary concern for any modern organization. Moreover, local IT hardware is seldom used at full capacity. To reduce IT infrastructure costs and waste, instead of acquiring physical hardware, organizations are increasingly consolidating workload on virtual machines (VMs) hosted on fewer servers. A remote server computer provides each VM as a virtual server with virtual resources, e.g., processing power, memory and disk space. Typically, each VM configuration is selected from a number of virtual resource templates (VRTs or templates). Each VM has allocated capacity (e.g. disk space, processing resources and memory) and is configured (software stack and licenses) for its intended purpose and expected needs. A key problem to managing these VMs is determining how to optimize resource capacity and configuration to maximize VM density without impairing performance.

Typically, a service provider may allocate/place physical resources for each VM based, primarily, on provider system optimization, on workload predictions and on results from continuously monitoring VM resource usage. Under-allocation (providing each VM with only a portion of the entire request) may utilize all resources, while impairing the users' Quality-of-Service (QoS). Over-allocation (providing each VM with the entire request and maintaining some slack) may insure acceptable user QoS, but wastes resources and energy, and reduces available capacity for subsequent requesting users. Ideally, allocation is balanced with adequate IT resources allocated without waste, while also maintaining the user's QoS.

Where a host computer memory was found to limit VM capacity, service providers have tried to increase memory capacity, short of adding more memory, which may require a complete system architecture change in some circumstances. So, for example, providers have used content-based page sharing (CBPS) techniques, such as Kernel Samepage Merging (KSM), to consolidate host memory for identical contents across multiple VMs, to increase the host's VM density and utilization. However, while this has improved capacity on individual hosts, the improvement is only incremental.

Thus, there is a need for locating VMs on host computers for efficiently consolidating resources across virtualized environments; and more particularly, there is a need for migrating VMs between hosts for improved resource allocation efficiency, improved energy conservation and security, while avoiding increasing capital expenditures, network latency, and resource management requirements.

SUMMARY OF THE INVENTION

A feature of the invention is consolidation of resources provisioned for VMs over multiple host systems;

Another feature of the invention is improved VM density among host systems in a cloud environment;

Yet another feature of the invention is optimal utilization of cloud resources from consolidation of resources provisioned for VMs, cloistering existing and new VMs in cloud hosts to maximize utilization.

The present invention relates to a shared resource system, a method of managing resources on the system and computer program products therefor. A resource consolidation unit causes identification of identical memory segments on host computers. The resource consolidation unit may be in one or more host computers. Each identical memory segment is associated with multiple instances of resources provisioned on at least two host computers. The resource consolidation unit causes provisioned resources to be migrated for at least one instance from one of the two hosts to another. On the other host computer the migrated resources share respective identical memory segments with resources already provisioned on the other host.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
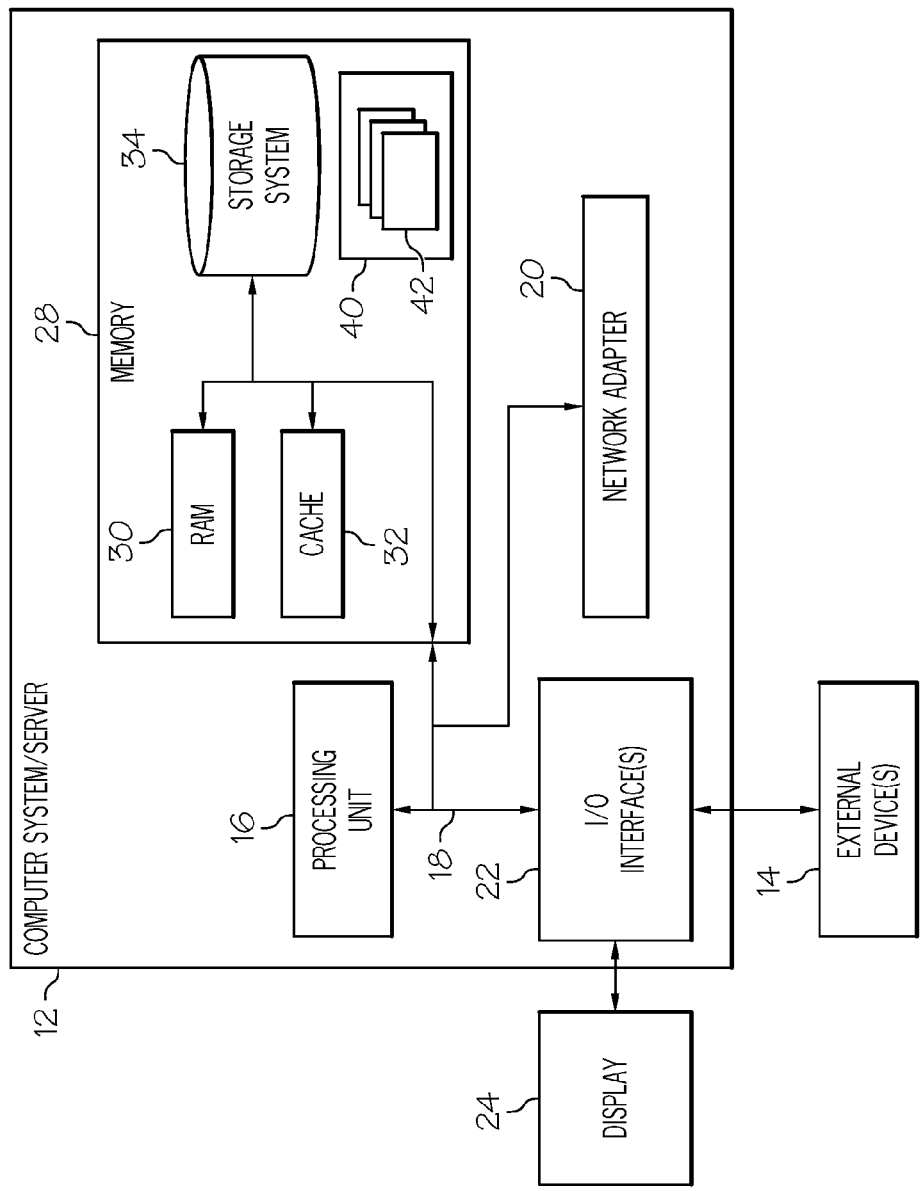
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service. Moreover, the present invention provides for client self-monitoring for adjusting individual resource allocation and configuration on-the-fly for optimized resource allocation in real time and with operating costs and energy use minimized.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources, sometimes referred to as a hypervisor, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
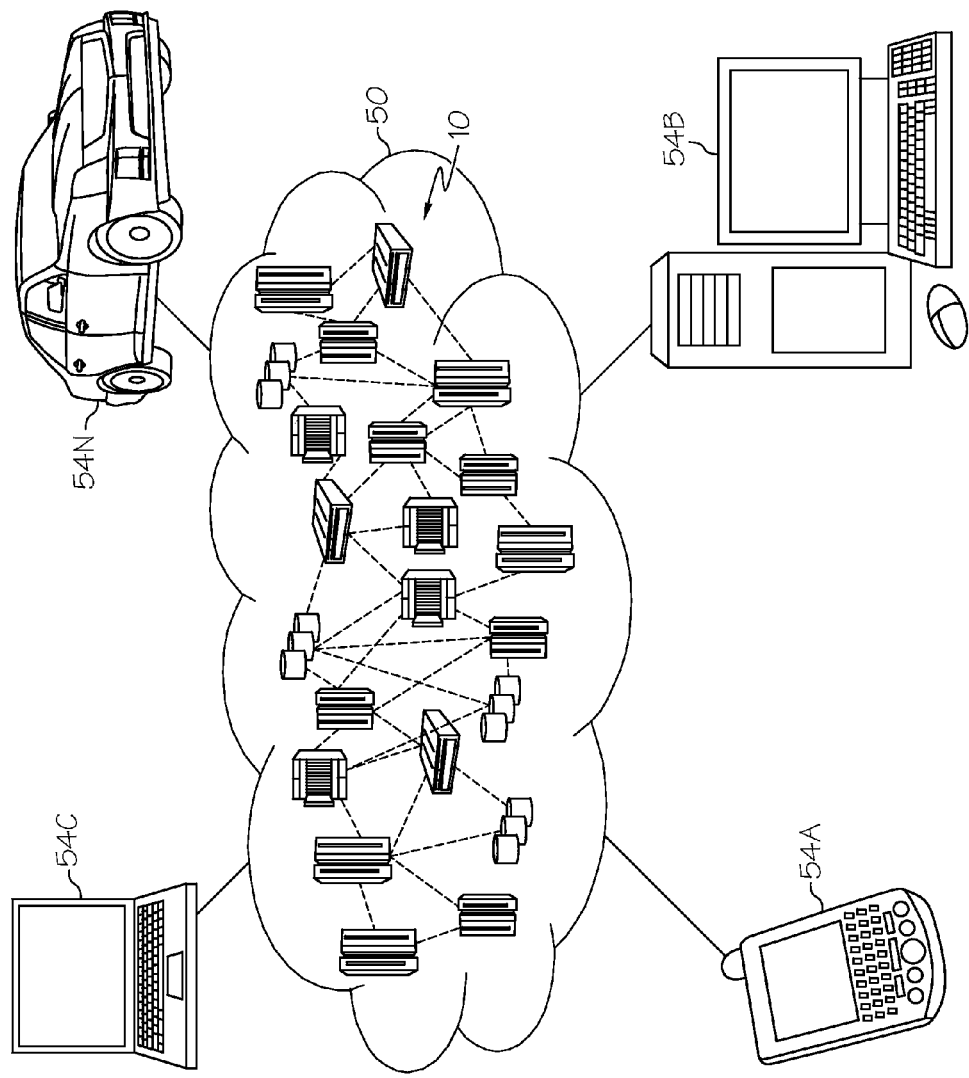
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
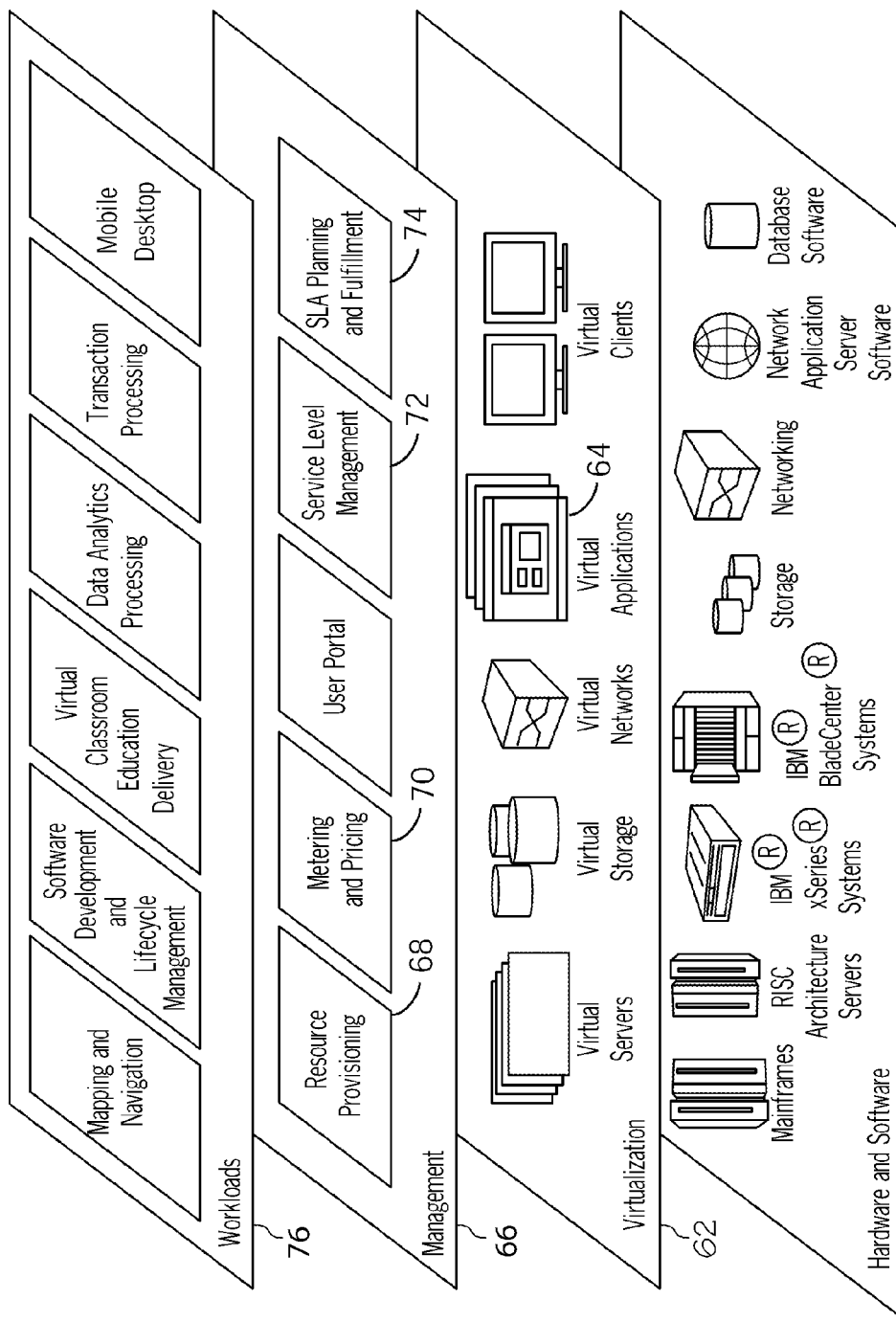
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems 64; and virtual clients.

In one example, management layer 66 may provide the functions described below. Resource provisioning 68 provides dynamic procurement of computing resources and other resources that are utilized to perform tasks within the cloud computing environment. Metering and Pricing 70 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management 72 provides cloud computing resource allocation and management such that required service levels are met. Service Level Agreement (SLA) planning and fulfillment 74 provide pre-arrangement for, and procurement of, cloud computing resources for which a future requirement is anticipated in accordance with an SLA.

Workloads layer 76 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
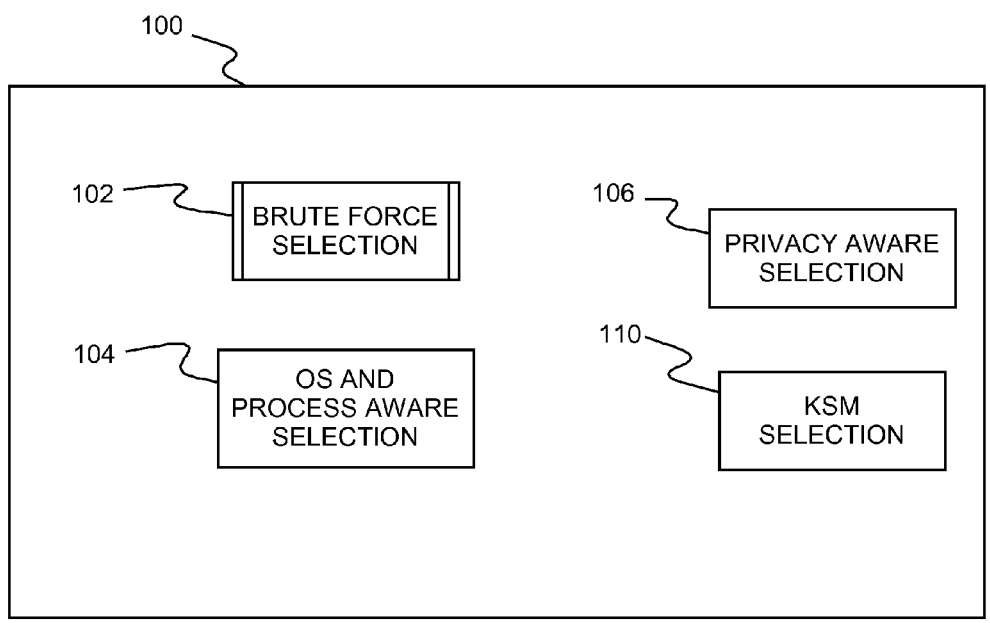
FIG. 4 shows an example of a a resource provisioning and management for consolidated resource allocation, e.g., in the management layer, according to a preferred embodiment of the present invention.

FIG. 4 shows an example of resource provisioning and management 100 for consolidated resource allocation, e.g., in management layer 66, according to a preferred embodiment of the present invention with reference to FIGS. 1-3. Preferred resource provisioning and management 100 may reside in one or more network nodes 10, in resource provisioning 68, Metering and Pricing 70, service level management 72, SLA planning and fulfillment 74, or separately as a resource consolidation unit within the management layer 66. Preferred resource provisioning and management 100 analyzes virtual machine (VM) requests and provisioned VMs to identify instances of storage commonality, such that the identified VMs require identical memory data segments/pages; and, where appropriate places/migrates those identified VMs to reduce the total physical memory requirements to consolidate memory allocation for those VMs.

Resource provisioning and management 100 may select memory for consolidation using any or all of brute force selection 102, Operating System (OS) and process aware selection 104, privacy aware selection 106 and distributed Kernel Samepage Merging (KSM) selection 110, individually or sequentially. Preferably, resource provisioning and management 100 consolidates VMs across a cloud to optimize physical memory use, placing VMs to minimize physical memory use through content-based page sharing across the cloud nodes 10. Consolidating VMs 100 in a distributed environment, such as a cloud environment, with a common memory representation to a single physical node, reduces overall the total physical memory requirements by virtually replicating memory spaces occupied by identical contents, which increases virtual memory capacity without changing physical capacity.

During brute force selection 102, cloud hosts 10 compare memory footprints of each provisioned VM across all the physical hosts 10 to identify common memory sections, e.g., sections or pages with common data and/or programs, that are used by all the processes on multiple VMs. Typically, this cloud-wide matching is computationally intensive, especially for large collections of systems.

OS and process aware selection 104 places VMs based on estimated memory requirements, extracted from information on operating systems and processes present in each VM. VM memory contents are estimated based on the particular OS, e.g., version and services, and listed running processes. By exchanging OS details and process lists for each VM node, VMs are placed to maximize the predicted number of shared pages, i.e., to minimize the number of repetitious instances of identical individual pages.

Figure 5:
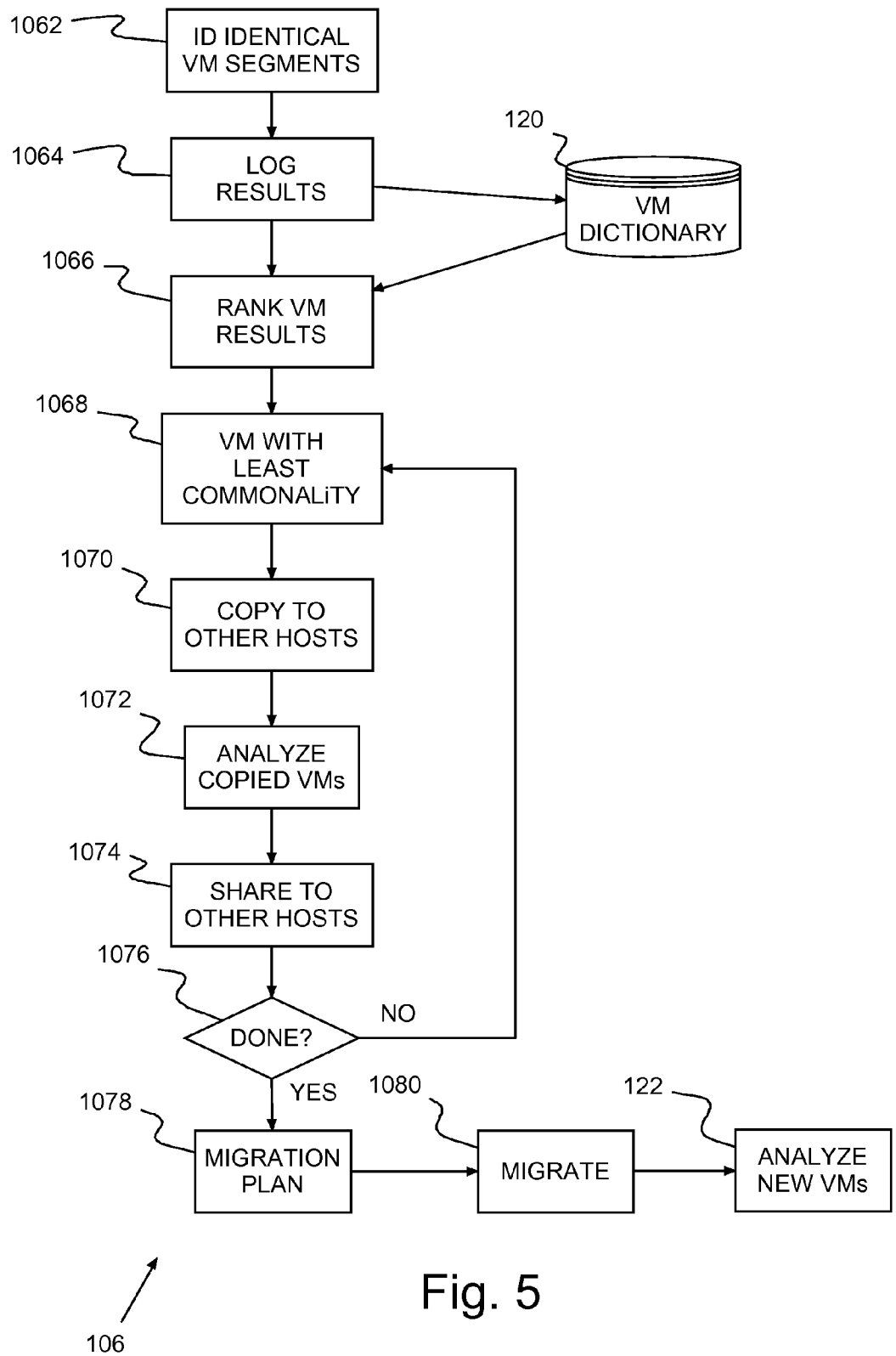
FIG. 5 shows an example of an example of privacy aware selection in more detail, essentially, in two phases, an initialization phase followed by an analysis phase.

FIG. 5 shows an example of privacy aware selection 106, essentially, in two phases, an initialization phase 1060 to create a shared dictionary 120, followed by an analysis phase 122 comparing new images against existing dictionary images. Preferably, the hosts 10 re-initialize 106 periodically, at specified intervals, based on frequency of VM creation/destruction or based on load.

Initialization begins with each host (10 in FIGS. 1 and 2) identifying 1062 the number of memory pages or segments on each VM that are shared with VMs both on that host and on other hosts. Recording 1064 the results generates the dictionary 120. Then, the hosts 10 rank 1066 VMs according to shared pages. Preferably, the hosts 10 rank 1066 VMs based on the level of commonality with other VMs on that same host 10. So, for example, lowest ranked VMs may have the least shared memory with other VMs on the same host.

Each host 10 iteratively selects 1068 VMs with the least shared memory, and copies 1070 the selected VMs to another, target host 10. Preferably each host 10 copies the VM(s) with the least local commonality (or pre-computed hashes of unshared memory space) with other local VMs to a target host 10. The target host 10 analyzes 1072 the commonality of the copied or migrated VM with local VMs, and shares 1074 the results. When all VMs, or a predetermined maximum number of VMs, 1076 have been selected 1068, copied 1070 and analyzed 1072, the shared dictionary 120 is complete. The hosts 10 examine the results 1078 to determine a migration plan that optimizes utilization and the hosts 10 migrate selected images 1080 to whichever host 10 is predicted to share the most pages. Thereafter, the hosts 10 use the dictionary to analyze 122 each new VM against known VMs to assist in deciding how to optimally migrate the new VMs.

Figure 6A:
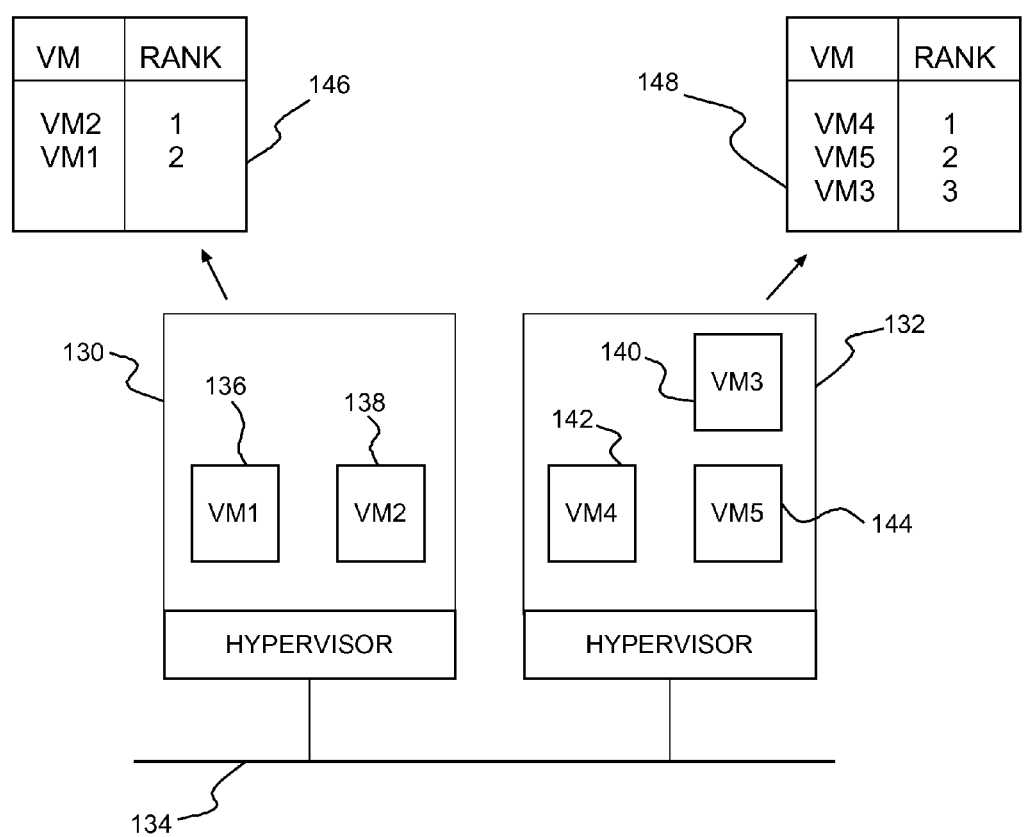
FIGS. 6A-B show an example of application of the initialization phase to a pair of hypervisor hosts connected on network, and provisioned with VMs.
Figure 6B:
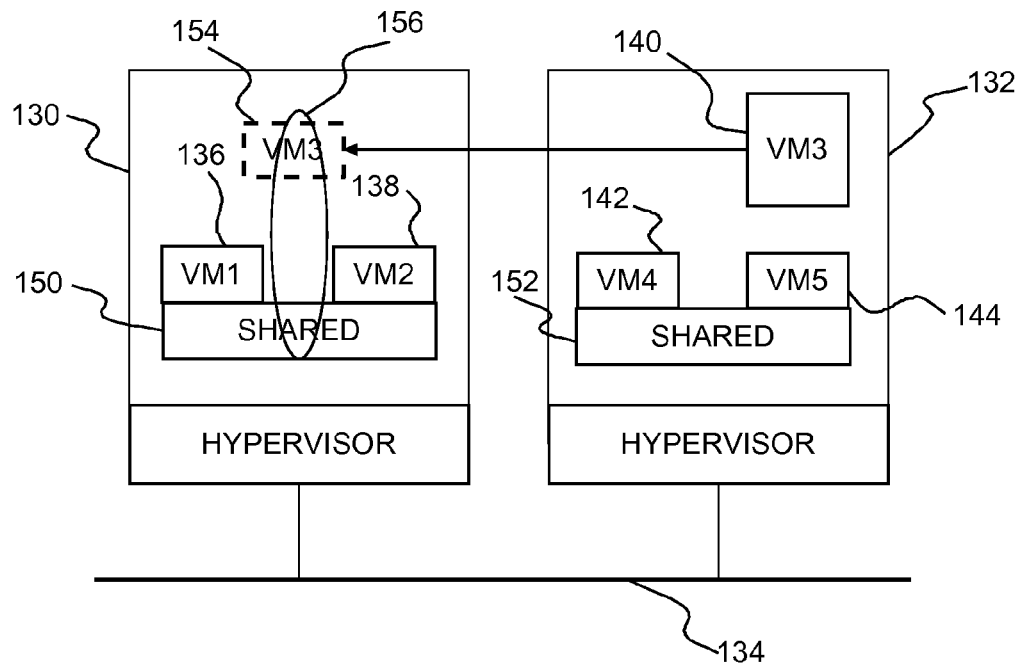

FIGS. 6A-B show an example of application of the initialization phase to a pair of hypervisor hosts 130, 132 connected on network 134, and provisioned with VMs 136, 138, 140, 142, 144, with reference to FIG. 5. During initialization, the hosts 130, 132 each rank 1066 VMs 136, 138, 140, 142, 144, according to the degree of commonality in memory pages, shown in tables 146,148. In this example, VM3 140 shares little with VM4 142 and VM5 144, which share common memory contents, e.g., memory with identical OS and/or applications. Thus, potentially, migrating VM3 140 to the other host 130 may improve consolidation.

So, after host 130 identifies 1062 common content 150 in VM1 136 and VM2 138; and, host 132 identifies 1062 common content 152 in VM4 142 and VMS 144; and the hosts 130, 132 rank 1066 the results. Host 132 selects 1068 and copies 1070 VM3 140 to target host 130. The target host 130 compares 1072 the copy 154 with provisioned memory, including common content 150 memory, to determine whether the copied VM3 150 shares any commonality with local VM1 136 and VM2 138 to identify segments 156 with common content. Likewise, subsequently copying, first VM2 132 and then, VM2 to host 132 can identify areas to further consolidate based on any other identified commonality. This comparison prevents migration or copying of VMs that does not lead to an optimal placement or improve the existing placement and is, therefore, undesirable and/or unnecessary.

Figure 6C:
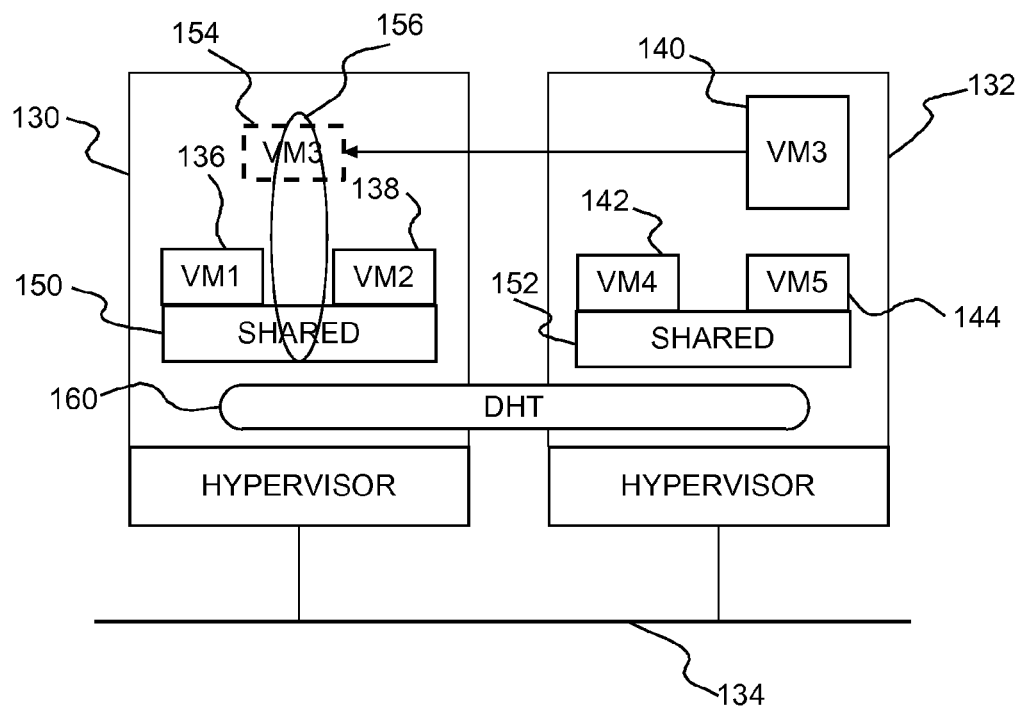
FIG. 6C shows an example of application of agnostic or distributed KSM selection to the cloud arrangement of FIG. 6A.

FIG. 6C shows an example of application of agnostic or distributed KSM selection 110 to the cloud arrangement of FIG. 6A with similar results in this example and with like features labeled identically. Distributed KSM selection 110 is similar to KSM, which is used to consolidate resources for a single host. However where KSM focuses on a single host, distributed KSM selection 110 maintains a distributed hash table (DHT) 160 across distributed cloud hosts 130, 132. The DHT 160 chronicles physical machine history for hosts 130, 132 with one or more VMs 136, 138, 140, 142, 144 running.

Preferably, the DHT 160 includes a history of recorded hashed values that indicate page stability. For example, the DHT 160 may include a value field that stores page characteristics across VMs 136, 138, 140, 142, 144 and physical nodes 130, 132. Further, the DHT 160 also may include additional metadata on the pages, e.g., size, frequency of access, VM and physical node. Optionally, the DHT 160 may be multi-layer, with one layer for VMs 136, 138, 140, 142, 144 and another layer for physical nodes 130, 132. In this optional multi-layer example, only the physical node layer is updated for every occurrence of a merge/migrate operation. By comparing hashed value history stability, the DHT 160 identifies pages as relatively stable or unstable.

A kernel-level memory ordering technique may be used to address/minimize memory effect fragmentation across identified pages. Thus, combining distributed KSM with kernel-level memory ordering prevents memory faults from occurring from address mismatches to facilitate maintaining block integrity for memory fragmented across multiple pages, even after migration in a scalable and controlled manner.

Advantageously, the present invention selectively migrates virtual machines (VMs) from one server to another to consolidate server resources in virtualized environments. This consolidation improves efficient allocation of existing resources, energy conservation, and security, and reduces capital expenditures, network latency, and management requirements. In particular, application of the present invention optimally places VMs in a distributed environment to maximize hardware resource utilization, by optimizing content-based page sharing (CBPS) effectiveness over a distributed computational environment.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A shared resource system comprising:
   a plurality of client devices;
   a plurality of service provider computers selectively making resource capacity available to said plurality of client devices;
   a network, resource capacity being provided to said plurality of client devices from said plurality of service provider computers over said network; and
   a resource consolidation unit identifying multiple instances of identical provisioned resources located on two or more of said plurality of service provider computers and migrating one or more instance of the multiple identified instances to a single one of said two or more, said resource consolidation unit causing each of said two or more to compare memory footprints of each provisioned virtual machine (VM) with provisioned VMs on all other ones of said two or more to identify common memory sections.

2. A shared resource system as in claim 1, wherein said plurality of service provider computers are cloud computers, provided resource capacity including virtual machines (VMs) provisioned for ones of said plurality of client devices.

3. A shared resource system as in claim 2, wherein a plurality of said provisioned VMs include a provisioned operating system (OS) and one or more software applications in memory, each VM being on a particular cloud computer hosting said each VM, said resource consolidation unit identifying commonality between operating systems and software applications among provisioned VMs.

4. A shared resource system as in claim 3, said resource consolidation unit extracting information on OS and processes present in each VM and estimating memory requirements responsive to extracted said information, said VMs being placed on hosts responsive to said estimated memory requirements.

5. A shared resource system as in claim 3, wherein said resource consolidation unit comprises consolidation history indicating instances of resources on each of said plurality of service provider computers.

6. A shared resource system as in claim 5, said resource consolidation unit analyzing images of provisioned VMs to create a dictionary indicating said consolidation history, said resource consolidation causing migration of said provisioned VMs between hosts to minimize identical instances of identical memory segments among said hosts, said resource consolidation unit comparing new images against said dictionary of existing images.

7. A shared resource system as in claim 3, said resource consolidation unit maintaining a distributed hash table (DHT) across said hosts, said DHT chronicling physical machine history for said hosts with one or more provisioned VMs.

8. A method of managing resources, said method comprising:
   identifying identical memory segments on a plurality of host computers, each identical memory segments being associated with a plurality of instances of resources provisioned on at least two of said plurality of host computers, wherein identifying identical memory segments comprises comparing memory footprints for every virtual machines (VM) on every host computer against memory footprints for every VM on every other host computer; and
   migrating provisioned resources for at least one of said plurality of instances from one of said at least two to another of said at least two, the migrated provisioned resources sharing respective said identical memory segments with resources previously provisioned on the other host computer.

9. A method of managing resources as in claim 8, wherein said plurality of host computers are cloud computers, provisioned resource capacity including VMs provisioned for ones of a plurality of cloud client devices.

10. A method of managing resources as in claim 9, wherein identifying identical memory segments comprises:
    extracting OS and process information from each VM; and
    estimating memory requirements responsive to extracted said OS and process information, said VMs being migrated to, and placed on, hosts responsive to said estimated memory requirements.

11. A method of managing resources as in claim 9, wherein identifying identical memory segments comprises:
    causing each host computer to analyze images of provisioned VMs on the respective said each host computer to identify said identical memory segments between locally provisioned VMs;
    ranking said locally provisioned VMs according to local commonality, local commonality indicating the frequency of said identified identical memory segments with provisioned VMs on said each host computer;
    iteratively copying said locally provisioned VMs ranked as having the lowest commonality to each other host computer, said other host computer being a target host;
    comparing each copied VM against provisioned VMs on said target host, any said copied VM having a higher frequency on said target host being migrated to said target host, said migrated VMs minimizing identical instances of said identical memory segments among said host computers;
    creating a dictionary of existing images indicating said consolidation history from migrating copied VMs; and
    comparing new images against said dictionary of existing images, said new VMs being provisioned on one of said host computers with any said identical instances.

12. A method of managing resources in a cloud environment as in claim 9, wherein identifying identical memory segments comprises maintaining a distributed hash table (DHT) across said host computers, said DHT chronicling physical machine history for said host computers with one or more provisioned VMs.

13. A method of managing resources in a cloud environment as in claim 9, wherein a plurality of said provisioned VMs include a provisioned operating system (OS) and one or more software applications in memory, each VM being on a particular cloud computer hosting said each VM, said resource consolidation unit identifying commonality between operating systems and software applications among provisioned VMs.

14. A computer program product for managing cloud environment resources, said computer program product comprising a non-transitory computer usable medium having computer readable program code stored thereon, said computer readable program code causing computers executing said code to:
   identify identical memory segments on a plurality of host computers, each identical memory segments being associated with a plurality of instances of resources provisioned on at least two of said plurality of host computers, wherein identical memory segments are identified by comparing memory footprints on every computer hosting provisioned resources against memory footprints for hosted resources on every other host computer; and
   migrate provisioned resources for at least one of said plurality of instances from one of said at least two to another of said at least two, the migrated provisioned resources sharing respective said identical memory segments with resources previously provisioned on the other host computer.

15. A computer program product for managing resources as in claim 14, wherein managed resources includes provisioned virtual machines (VMs) on cloud computers hosting said VMs, and said computer readable program code causing computers executing said code to identify identical memory segments causes computers executing said code to:
   extract OS and process information from each VM; and
   estimate memory requirements responsive to extracted said OS and process information, said VMs being migrated to, and placed on, hosts responsive to said estimated memory requirements.

16. A computer program product for managing resources as in claim 14, wherein managed resources includes provisioned virtual machines (VMs) on cloud computers hosting said VMs, and said computer readable program code causing computers executing said code to identify identical memory segments causes computers executing said code to:
   analyze images of provisioned VMs on the respective said each host computer to identify said identical memory segments between locally provisioned VMs;
   rank said locally provisioned VMs according to local commonality, local commonality indicating the frequency of said identified identical memory segments with provisioned VMs on said each host computer;
   iteratively copy said locally provisioned VMs ranked as having the lowest commonality to each other host computer, said other host computer being a target host;
   compare each copied VM against provisioned VMs on said target host, any said copied VM having a higher frequency on said target host being migrated to said target host, said migrated VMs minimizing identical instances of said identical memory segments among said host computers;
   create a dictionary of existing images indicating said consolidation history from migrating copied VMs; and
   compare new images against said dictionary of existing images, said new VMs being provisioned on one of said host computers with any said identical instances.

17. A computer program product for managing resources in a cloud environment as in claim 14, wherein said computer readable program code causing computers executing said code to identify identical memory segments causes computers executing said code to maintain a distributed hash table (DHT) across said one or more computers hosting provisioned virtual machines (VMs) including said identified identical memory segments, said DHT chronicling physical machine history for said host computers with one or more provisioned VMs.

18. A computer program product for managing cloud resources, said computer program product comprising a non-transitory computer usable medium having computer readable program code stored thereon, said computer readable program code comprising:
   computer readable program code means for selectively making service provider computer resource capacity on each of a plurality of host devices available to requesting client devices;
   computer readable program code means for identifying identical memory segments in virtual machines (VMs) provisioned on separate service provider computers, wherein said computer readable program code means for identifying identical memory segments comprises computer readable program code means for comparing memory footprints of each provisioned VM with provisioned VMs on all cloud hosts to identify common operating system (OS) and one or more software applications in memory for said provisioned VMs; and
   computer readable program code means for selectively migrating one or more identified VMs to a service provider computer.

19. A computer program product for managing cloud resources as in claim 18, wherein said computer readable program code means for identifying identical memory segments comprises computer readable program code means for extracting information on OS and processes present in each VM and estimating memory requirements responsive to extracted said information, said VMs being placed on hosts responsive to said estimated memory requirements.

20. A computer program product for managing cloud resources as in claim 18, wherein said computer readable program code means for identifying identical memory segments comprises:
   computer readable program code means for analyzing images of provisioned VMs to create a dictionary indicating said consolidation history, said computer readable program code means for selectively migrating selecting said provisioned VMs between hosts to minimize identical instances of identical memory segments among said hosts; and
   computer readable program code means for comparing new images against said dictionary of existing images.

21. A computer program product for managing cloud resources as in claim 18, wherein said computer readable program code means for identifying identical memory segments comprises computer readable program code means for maintaining a distributed hash table (DHT) across said hosts, said DHT chronicling physical machine history for said hosts with one or more provisioned VMs.

22. A shared resource system comprising:
   a plurality of client devices;
   a plurality of service provider computers selectively making resource capacity available to said plurality of client devices;
   a network, resource capacity being provided to said plurality of client devices from said plurality of service provider computers over said network; and
   a resource consolidation unit identifying multiple instances of identical provisioned resources located on two or more of said plurality of service provider computers and migrating one or more instance of the multiple identified instances to a single one of said two or more, said resource consolidation unit analyzing images of virtual machines (VMs) provisioned on said two or more to create a dictionary indicating consolidation history, said resource consolidation causing migration of said provisioned VMs between said two or more to minimize identical instances of identical memory segments among said two or more, said resource consolidation unit comparing new images against said dictionary of existing images.

23. A method of managing resources, said method comprising:
identifying identical memory segments on a plurality of host computers, each identical memory segment being associated with a plurality of instances of resources provisioned on at least two of said plurality of host computers, wherein identifying identical memory segments comprises:
causing each host computer to analyze images of provisioned virtual machines (VMs) on the respective said each host computer to identify said identical memory segments between locally provisioned VMs,
ranking said locally provisioned VMs according to local commonality, local commonality indicating the frequency of said identified identical memory segments with provisioned VMs on said each host computer,
iteratively copying said locally provisioned VMs ranked as having the lowest commonality to each other host computer, said other host computer being a target host,
comparing each copied VM against provisioned VMs on said target host,
creating a dictionary of existing images indicating said consolidation history from migrating copied VMs, and
comparing new images against said dictionary of existing images, said new VMs being provisioned on one of said host computers with any said identical instances; and
migrating provisioned resources for at least one of said plurality of instances from one of said at least two to another of said at least two, the migrated provisioned resources sharing respective said identical memory segments with resources previously provisioned on the other host computer, any said copied VM having a higher frequency on said target host being migrated to said target host, said migrated VMs minimizing identical instances of said identical memory segments among said host computers.

24. A computer program product for managing cloud environment resources, said computer program product comprising a non-transitory computer usable medium having computer readable program code stored thereon, said computer readable program code causing computers executing said code to:
identify identical memory segments on a plurality of host computers, each identical memory segments being associated with a plurality of instances of resources provisioned on at least two of said plurality of host computers, wherein managed resources includes provisioned virtual machines (VMs) on cloud computers hosting said VMs, said code causing computers to identify identical memory segments causing said computers to:
analyze images of provisioned VMs on the respective said each host computer to identify said identical memory segments between locally provisioned VMs,
rank said locally provisioned VMs according to local commonality, local commonality indicating the frequency of said identified identical memory segments with provisioned VMs on said each host computer,
iteratively copy said locally provisioned VMs ranked as having the lowest commonality to each other host computer, said other host computer being a target host,
compare each copied VM against provisioned VMs on said target host,
create a dictionary of existing images indicating said consolidation history from migrating copied VMs, and
compare new images against said dictionary of existing images, said new VMs being provisioned on one of said host computers with any said identical instances; and
migrate provisioned resources for at least one of said plurality of instances from one of said at least two to another of said at least two, the migrated provisioned resources sharing respective said identical memory segments with resources previously provisioned on the other host computer, any said copied VM having a higher frequency on said target host being migrated to said target host, said migrated VMs minimizing identical instances of said identical memory segments among said host computers.

25. A computer program product for managing cloud resources, said computer program product comprising a non-transitory computer usable medium having computer readable program code stored thereon, said computer readable program code comprising:
computer readable program code means for selectively making service provider computer resource capacity on each of a plurality of host devices available to requesting client devices;
computer readable program code means for identifying identical memory segments in virtual machines (VMs) provisioned on separate service provider computers, wherein said computer readable program code means for identifying identical memory segments comprises:
computer readable program code means for analyzing images of provisioned VMs to create a dictionary indicating said consolidation history, said computer readable program code means for selectively migrating selecting said provisioned VMs between hosts to minimize identical instances of identical memory segments among said hosts, and
computer readable program code means for comparing new images against said dictionary of existing images; and
computer readable program code means for selectively migrating one or more identified VMs to a service provider computer.

* * * * *